United States Patent [19]

Robert

[11] 4,405,365
[45] Sep. 20, 1983

[54] METHOD FOR THE FABRICATION OF SPECIAL STEELS IN METALLURGICAL VESSELS

[75] Inventor: Edgardo J. Robert, Buenos Aires, Argentina

[73] Assignee: Pennsylvania Engineering Corporation, Milwaukee, Wis.

[21] Appl. No.: 412,552

[22] Filed: Aug. 30, 1982

[51] Int. Cl.³ .............................................. C21C 5/32
[52] U.S. Cl. ........................................ 75/60; 75/52; 75/59; 266/225
[58] Field of Search ................ 75/52, 59, 60; 266/225

[56] References Cited

U.S. PATENT DOCUMENTS 3,930,843  1/1976  Fruehan .................................. 75/60

Primary Examiner—P. D. Rosenberg
Attorney, Agent, or Firm—Fred Wiviott

[57] ABSTRACT

The device consists of a retractible tuyere which can be used with different types of steel melting furnaces, or any other metallurgical vessel. Said tuyere is introduced in the liquid steel bath to make the controlled refining of the same by means of gaseous oxygen injection with any other innert gas, generally argon.

The retractible tuyere consists of two concentric pipes. Through the annular gap between the pipes a cooling gas or liquid fluid is injected, which is generally an hydrocarbon.

Through the center pipe a refining gas mixture is injected. The system also consists of a cooled tuyere holding box and a fluid control and injection system.

The tuyere is generally introduced through an opening made in the side wall of the furnace, in a way that the tip of the same is located below the liquid steel level. Due to the retractible characteristic of the tuyere, the same is introduced in the bath only during the time required by the process.

3 Claims, 3 Drawing Figures

METHOD FOR THE FABRICATION OF SPECIAL STEELS IN METALLURGICAL VESSELS

BACKGROUND OF THE INVENTION

Fabrication of high alloy steels, particularly stainles steel, in electric furnaces, has some difficulties in cases of high Cr and low C contents (less than 0.10% Carbon), due to high process temperatures required, and Cr loss in slag due to the high oxidation needed to reduce the carbon content. As a result of the high temperatures in the furnace there is a high consumption of refractory. Both factors, refractory consumption and chromium losses makes this way of production costly and inefficient.

An alternate method is based in the AOD process. The AOD process is a metallurgical method that consists of a vessel with an opening on top of the same, and a set of tuyeres that are located in the side wall, below the liquid level, and usually extended radially in horizontal position.

The AOD converter is usually fed with hot metal by an electric furnace. The hot metal contains generally 0.9-1.7% carbon. A mixture of oxygen and argon having a ratio of about 3 parts of oxygen to 1 part of argon is blown through the center tuyere while argon or air is delivered through the outer tuyere pipe as a coolant or shielding fluid. During the process cycle, the ratio of argon and oxygen delivered to the center tuyere is changed.

The AOD process has the following disadvantage:
(a) High cost as a result of refractory wear, and high argon consumption for cooling and shielding.
(b) Low availability due to frequent shut downs for repair and maintenance.

SUMMARY OF THE INVENTION

It is an object of the invention to provide a new and improved metallurgical method.

A further object of the invention is to provide an argon/oxygen refining method to eliminate the AOD conversion method, with the significant cost saving, that results from the aforementioned elimination.

These and other objects and advantages of the present invention will become more apparent from the detailed description that follows.

DESCRIPTION OF THE PREFERED EMBODIMENT

Figure 1:
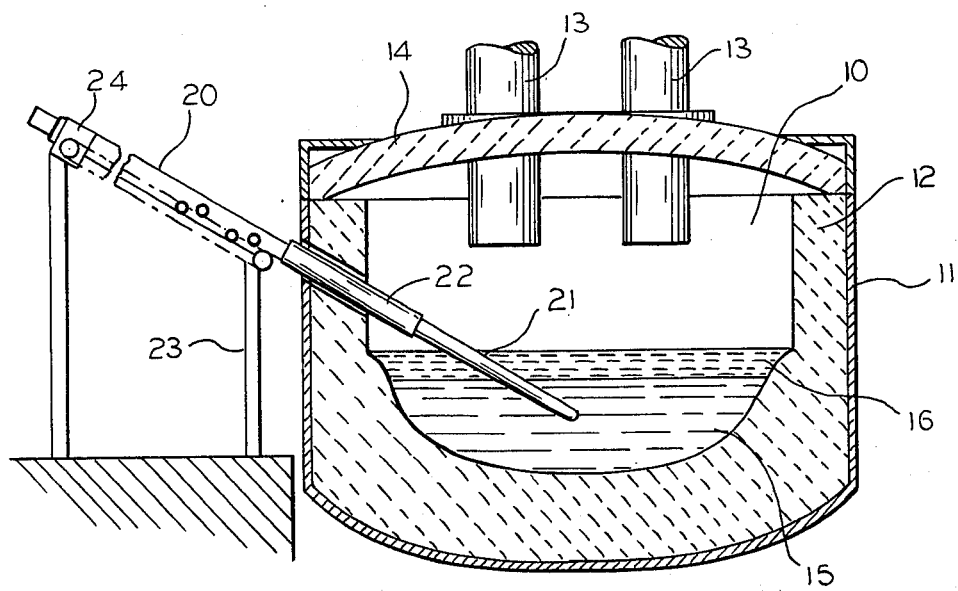
FIG. 1 shows a section of an electric furnace which is used as an example for this case, where the tuyere and the retractible device can be seen.

FIG. 1 shows the section of an electric furnace 10 formed by electrodes 13, a roof 14 lined with refractory or water cooled panels, a steel shell 11 and a refractory lining 12, whose walls may be replaced, in some cases, by water cooled panels.

During the operation of the furnace the same contains liquid steel 15 and slag 16.

A device 20 located on a side wall, allows the introduction of a tuyere 21 through an opening made in the wall of the furnace. Said tuyere is supported by a water cooled holder 22.

The complete device may be supported and guided by a structure 23, which has a drive which allows the positioning of the tuyere 21 to the required depth inside the liquid bath.

Figure 2:
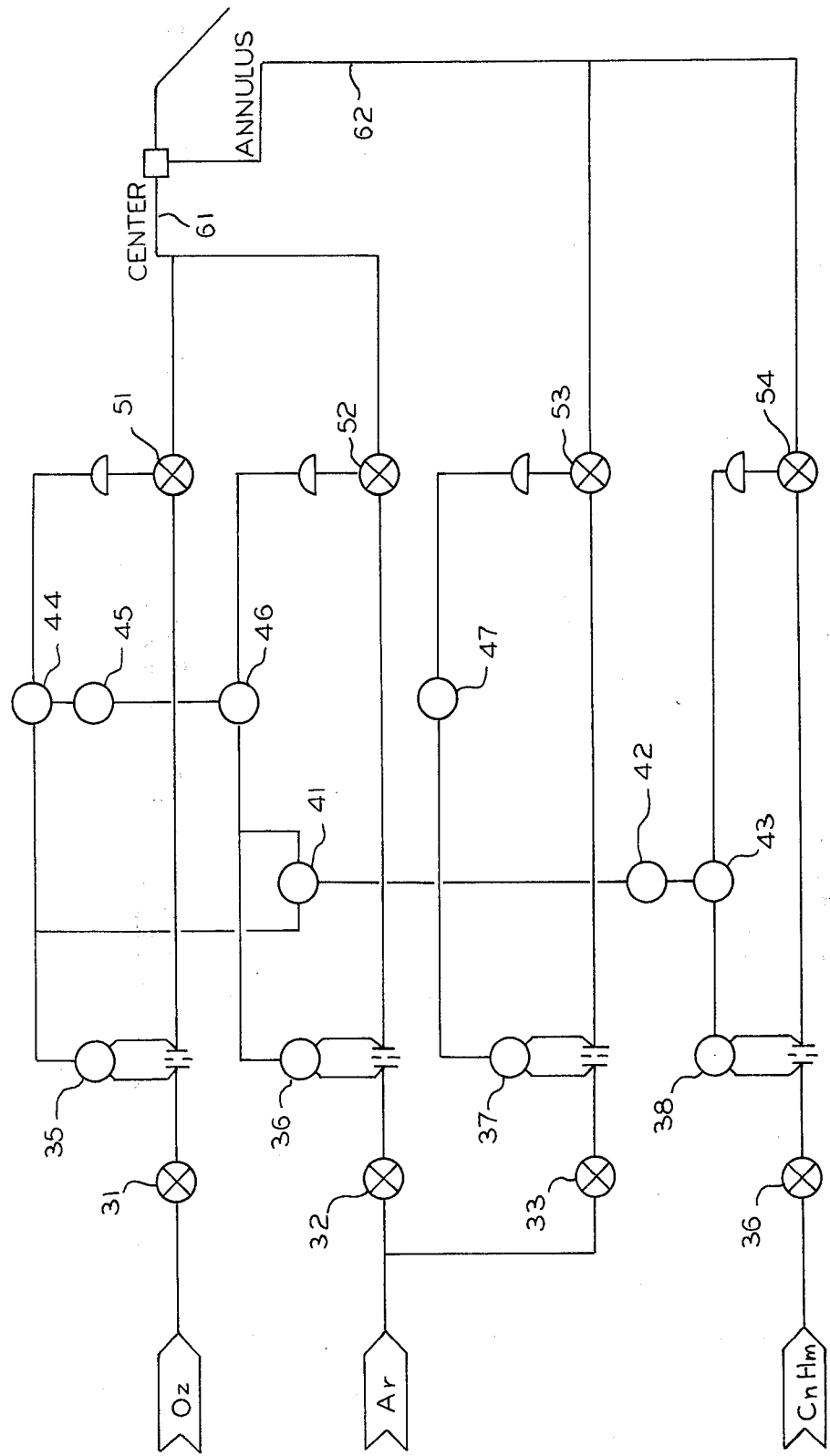
FIG. 2 shows a flow diagram of the injection system and gas control.

FIG. 2 shows the flow diagram of the gas injection system 30. This system allows the injection of gas to the center of the tuyere through the line 61, and to the annular gap through the line 62. The flow of the selected gases are controlled by the valves 31, 32, 33 and 34 with appropriate interlocking. The flow rate of oxygen is set by means of the controller 44 that receives the signal from a flow meter 35 and actuates on the flow control valve 51. The argon/oxygen ratio is set by means of the ratio station 45. The ratio signal from 45 is injected to the controller 46, which also receives the signal from the flow meter 36. The controller 46 makes a balance between the signal coming from the ration station 45 and from the flow meter 36, and actuates on the flow control valve 52. The system also set a fixed flow rate ratio between the line 61 and the hydrocarbon injection. The oxygen argon flow rates are added by mean of the summer 41 that generates a signal that is injected to the ratio station 42. The signal from the ratio station 42 is balanced with the signal from the flow rate meter 38, and the balanced signal controls the flow control valve 54, that controls the flow rate of the hydrocarbon.

Figure 3:
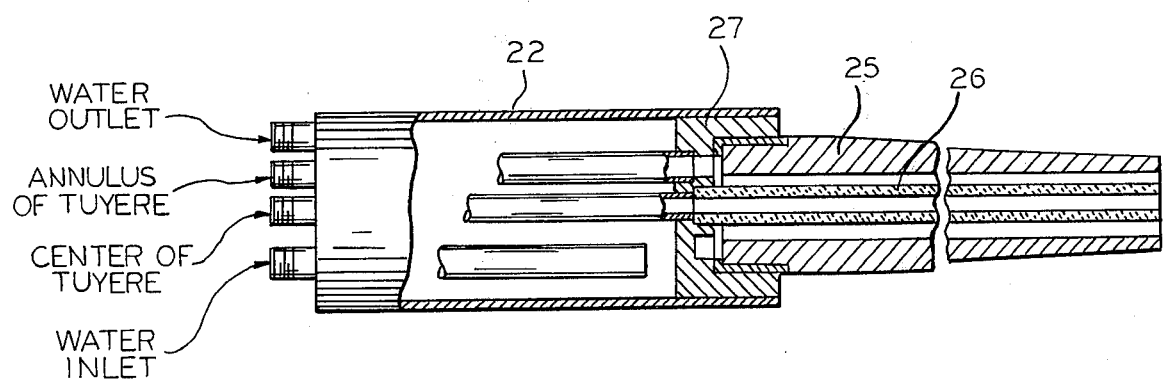
FIG. 3 shows a detail of the tuyere, the assembly and the holding system.

As alternate, argon can also be injected to the annular gap during the process. FIG. 3 shows a detail of the tuyere, in which it can be appreciated that the same consists of two concentric pipes. Outer pipe 25 is made of refractory to resists the action of slag and liquid steel, while the center pipe 27 is made with refractory material or heat resisstant steel. Both interchangeable pipes are fixed to a copper block 27, which forms part of the chamber 22 which is water cooled.

Following is the description of the operation of the device, according to the present invention.

When manufacturing high Chromium stainless steel, and very low Carbon contents, the electric furnace 10 operates conventionally, but having the precaution of keeping C in approx. 0.8/1.00% minimum to keep the bath with small oxidation and avoid excess of oxidation of Chromium to the slag. During the final stage of the manufacturing, natural gas is injected through the annular space of the tuyere at a flow rate of approximately 10% of the flow rate blown through the center tuyere. At the same time, a mix of Argon-Oxygen in a ratio 1:3 is injected through the center tuyere, and the nozzle is introduced below the liquid steel level. Argon/Oxygen ratio in the mix is gradually increased up to 3:1 toward the end of blowing.

Total volume of gas to be injected depends on the required initial and final Carbon content, injection should be made at a flow rate of 0.05-0.5 Nm/3 ton-min. At the end of the injection it is possible to obtain Carbon contents in the bath of about 0.03/0.02% and typical chromium content of about 16% depending on the final temperature of liquid steel.

The application of the invention will be further understood with the following example of application.

Considering a 20 ton capacity steel electric furnace, liquid steel is produced by means of a conventional practice which, after dephosphorization and desulfurization, has the following analysis:

Cr 18%  C 0.95%  SI 0.25%  Al 0.050%

Temperature of the liquid steel is 1550° C. At this stage, the tuyere begins to be operated in the following conditions: Natural gas is injected through the annular gap of the tuyere at a flow of 50/60 Nm³/h and a flame is produced at the tip of the same. Then it begins the injection of oxygen/argon mixture through the central pipe of the tuyere at a flow rate of 600 Nm³/h.

The tuyere is introduced in the bath, being the top of the same located below the liquid level during 47 minutes, changing the ratio during this injection period and removing the tuyere when the refining period is finished. Total refining gases injected shall be as follows: 250 Nm³ oxygen and 220 Nm³ argon. The carbon content shall be 0.03% and chromium content shall be 16%, both at the end of the injection.

After blowing the slag is reduced by means of FeSi which will reverse the chromium into the bath.

Temperature and chromium are eventually adjusted and the liquid steel is tapped, making the trimming additions in the ladle.

This procedure can also be applied to manufacture carbon and alloy steels of very low carbon content.

The special design of the tuyere regarding cooling of the same through natural gas or some other hydrocarbon and the types of materials used, makes that the life of the tuyere can be estimated to be of many heats. This design has the advantage of being applicable to electric furnaces, or any other metallurgical vessel, and allows the use of high carbon ferroalloys, the change of the tuyere does not interrupt the operation of the furnace. Otherwise, if needed, the system can also inject pulverized lime, using oxygen or any other carrier gas.

The type of refractory used for the tuyere depends on the type of slag (practise) used. For acid slags SiO2 may be used, and for basic slags, alumina-graphite or high alumina can be used.

I claim:

1. A method of manufacturing high chromium, low carbon steel comprising the steps of:
   providing a quantity of molten ferrous metal which includes chromium and at least 0.8–1% carbon,
   inserting a lance having concentric inner and outer injection pipes to said metal,
   initially blowing a hydrocarbon fluid through the outer lance pipe and an argon-oxygen mixture through the inner lance pipe, the ratio of argon to oxygen initially being about 1:3,
   continuing the blowing of hydrocarbon fluid and the argon-oxygen mixture until the level of carbon in said metal is reduced to about 0.02–0.03% while progressively increasing the ratio of argon and oxygen to about 3:1.

2. The method set forth in claim 1 wherein the ratio of the argon-oxygen mixture injected through the inner lance pipe to the hydrocarbon fluid injected through the outer lance pipe is about 10:1.

3. A lance for injecting oxygen into a quantity of molten metal contained in a metallurgical vessel, comprising a hollow holder, a first pipe extending from said holder and being formed of a refractory material,
   a second smaller pipe extending from said holder and disposed concentrically within said first pipe and spaced therefrom,
   a first inlet pipe extending through said holder and connected to the gap between said first and second pipes for delivering a hydrocarbon fluid thereto,
   a second pipe extending through said holder and connected to the interior of the inner pipe for delivering an argon-oxygen mixture thereto, and
   inlet and outlet water pipes connected to the hollow interior of said holder for circulating cooling water therethrough.

* * * * *